Nov. 28, 1933.     W. WETTA, SR     1,936,814
COLLAPSIBLE FREEZER BOX FOR MEATS
Filed July 18, 1932

Inventor
William Wetta, Sr.

Attorney

Patented Nov. 28, 1933

1,936,814

UNITED STATES PATENT OFFICE 1,936,814

COLLAPSIBLE FREEZER BOX FOR MEATS

William Wetts, Sr., Cincinnati, Ohio, assignor to The Kroger Grocery & Baking Co., Cincinnati, Ohio, a corporation of Ohio Application July 18, 1932. Serial No. 623,256

3 Claims. (Cl. 100—57)

This invention relates to a collapsible container for correctly molding and freezing slabs of bacon or the like in preparing the product for slicing or other purposes and it is an object of the invention to provide a container or box formed of suitable material and construction which can be easily assembled to receive slabs of meat and which may be collapsed to expedite the removal of the product after being molded and frozen and by the use of such a container a decided saving results in the amount of space occupied. The exposure and the shrinkage of the product which is due to the ordinary methods of handling such products is greatly reduced, all of which will be hereinafter more fully described and claimed.

Figure 1:
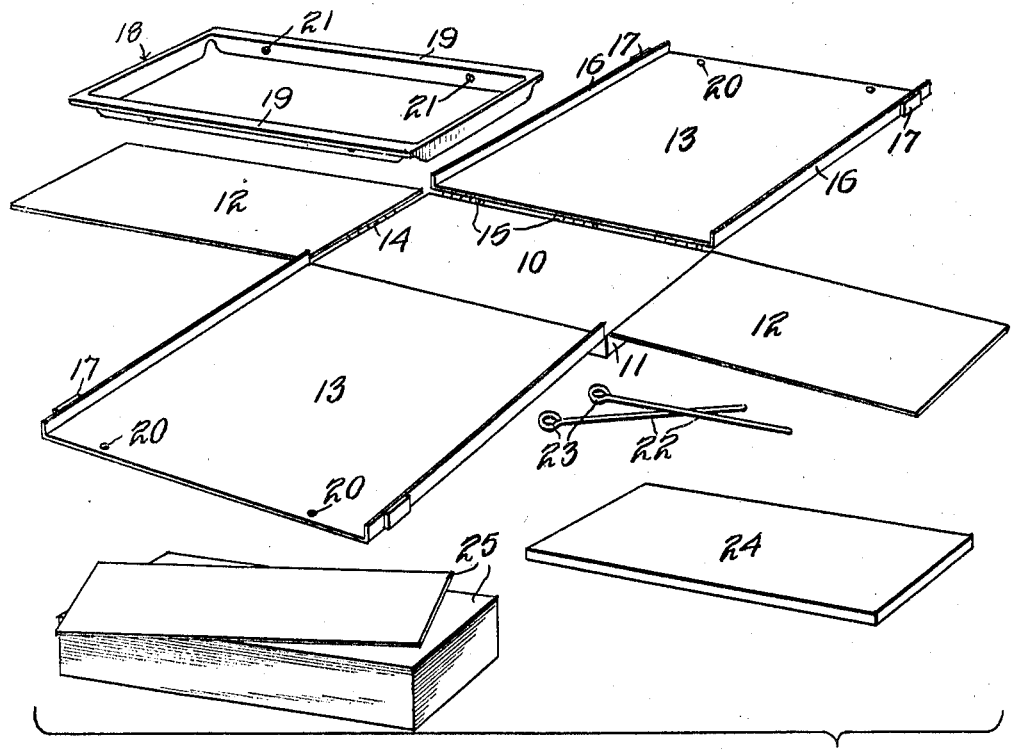
Figure 2:
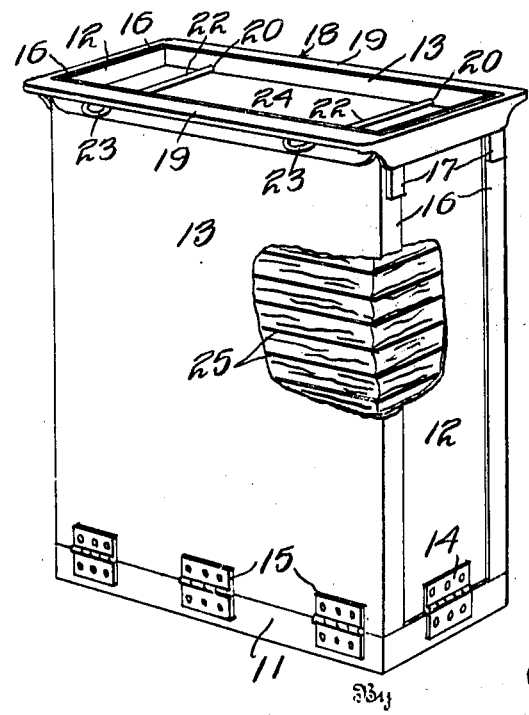

Referring to the accompanying drawing, which is made a part hereof and on which similar reference characters indicate similar parts, Figure 1 is a perspective view of the parts of the device shown in a disassembled position; and Figure 2 is a perspective view of the container in assembled position showing slabs of bacon arranged therein.

In the drawing reference character 10 indicates the bottom of the container having a supporting flange 11 formed on the edges. The ends 12 and the sides 13 are outwardly hinged at 14 and 15 respectively to the flange 11 of the bottom. The sides 14 are provided with vertical inturned edges 16 which fit over the vertical edges of the ends 12 to hold them in vertical position when assembled. The sides are further provided with the lugs 17 near the top along the outer surface of the inturned edges 16. A securing frame 18 is positioned around the outside of the container on the lugs 17 which prevent it from slipping downward. The frame 18 is provided with outwardly extending flanges 19 on its sides which serve as an aid in placing and removing the frame and as a means by which the container may be lifted after being assembled.

The sides 14 and the frame 18 are provided with the openings 20 and 21 in each side through which the securing pin 22 may be inserted to hold the presser board 24 in place after the container has been packed under pressure. The pins 22 are ringed at one end 23 which serves as an aid in placing and removing them. A number of spacer plates 25 are shown and of such a size as to conform to the interior of the container and may be placed between adjacent slabs or pieces of bacon.

The operation of the device is as follows:

As shown in Figure 1, the container being in collapsible position, the ends 12 are first raised to vertical position and then the sides 14 so that the edges 16 extend over the outside edges of the ends. The frame 18 is placed around the container and is supported on the lugs 17.

Slabs of bacon or the like are then placed in the container with a spacer 25 and a sheet of parchment paper cut to size between the adjacent pieces. The number of slabs necessary depends on the size of the container, the quality and thickness of the product but a sufficient number should be used to completely fill the container when the desired pressure is applied by any suitable press to the board 24 on top of the stack. As soon as the board clears the openings the pins 22 are inserted to hold the board in position as shown in Figure 2. After the packing operation the containers are then placed in any suitable freezer or the like for a period of time necessary to freeze the contents.

The containers are then removed from the freezer. The board 24 is forced downward to release the pins 22. The frame 18 is removed and the sides and ends of the container are collapsed assuming the position shown in Figure 1. The contents are ready and may be easily transferred to the slicing machine.

It is evident from the construction and operation described that the product is handled in such a manner that loss due to shrinkage and exposure is reduced. Waste is reduced since the product is molded and frozen which makes it possible to utilize the entire product and furthermore a more uniform finished product ready for the market results. The container is simple in construction; easily manipulated and affords a very successful and efficient means for handling products of the character described and it is possible to vary the shape and size and to utilize the construction for other products of a similar nature.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. A collapsible container comprising a bottom elevated on flanges, side and end members hinged to said flanges, perforations in said side members, said side members being provided with inturned edges adapted to engage the vertical edges of said end members, a flanged frame positioned around said members to hold them in assembled position, perforations in said flanges, lugs on said inturned edges for holding said frame in place, a presser board adapted to be placed in said container and means extending through the perforations in said side members and flanges to hold said board in place when the container is packed under pressure.

2. A collapsible container comprising a bottom elevated on flanges, side and end members pivoted thereto, the vertical edges of said side members being bent inwardly to extend over the vertical edges of said end members when assembled, a flanged securing frame positioned at the top around said members to hold them together, aligned perforations in said sides and flanged frame, a presser board, and pins extending through said perforations in said frame and said side members adapted to hold said board in position when the container is packed.

3. A collapsible meat molding container comprising a bottom elevated on flanges, sides and ends hinged thereto, a securing member adapted to fit around and hold said sides and ends in assembled position, a presser board adapted to fit into said container, and means projecting through perforations in said sides and securing member to hold said board in said container.

WILLIAM WETTA, Sr.